M. E. ANDERSON.
WAGON SCALE.
APPLICATION FILED DEC. 11, 1914.
1,137,447. Patented Apr. 27, 1915.
2 SHEETS—SHEET 2.
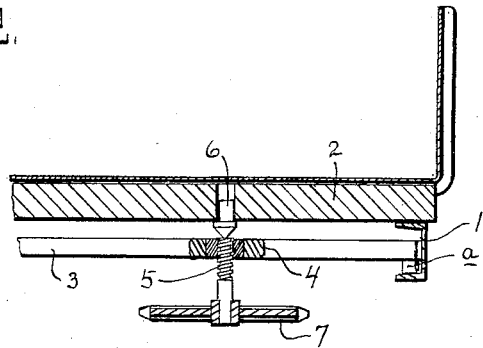
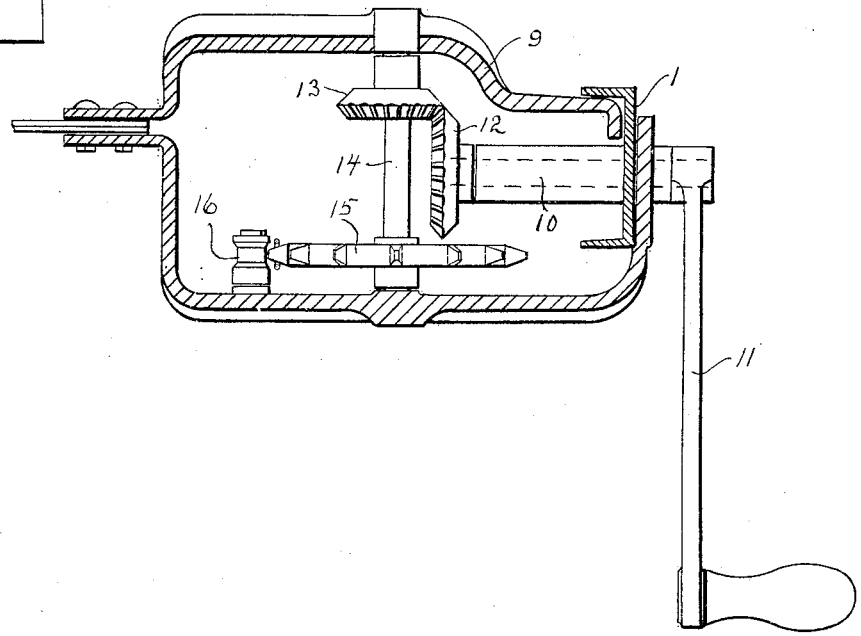
Witnesses
James P. Haskell,
Frank W. Haskell.
Inventor
Martin E. Anderson,
By Walter N. Haskell,
his Attorney

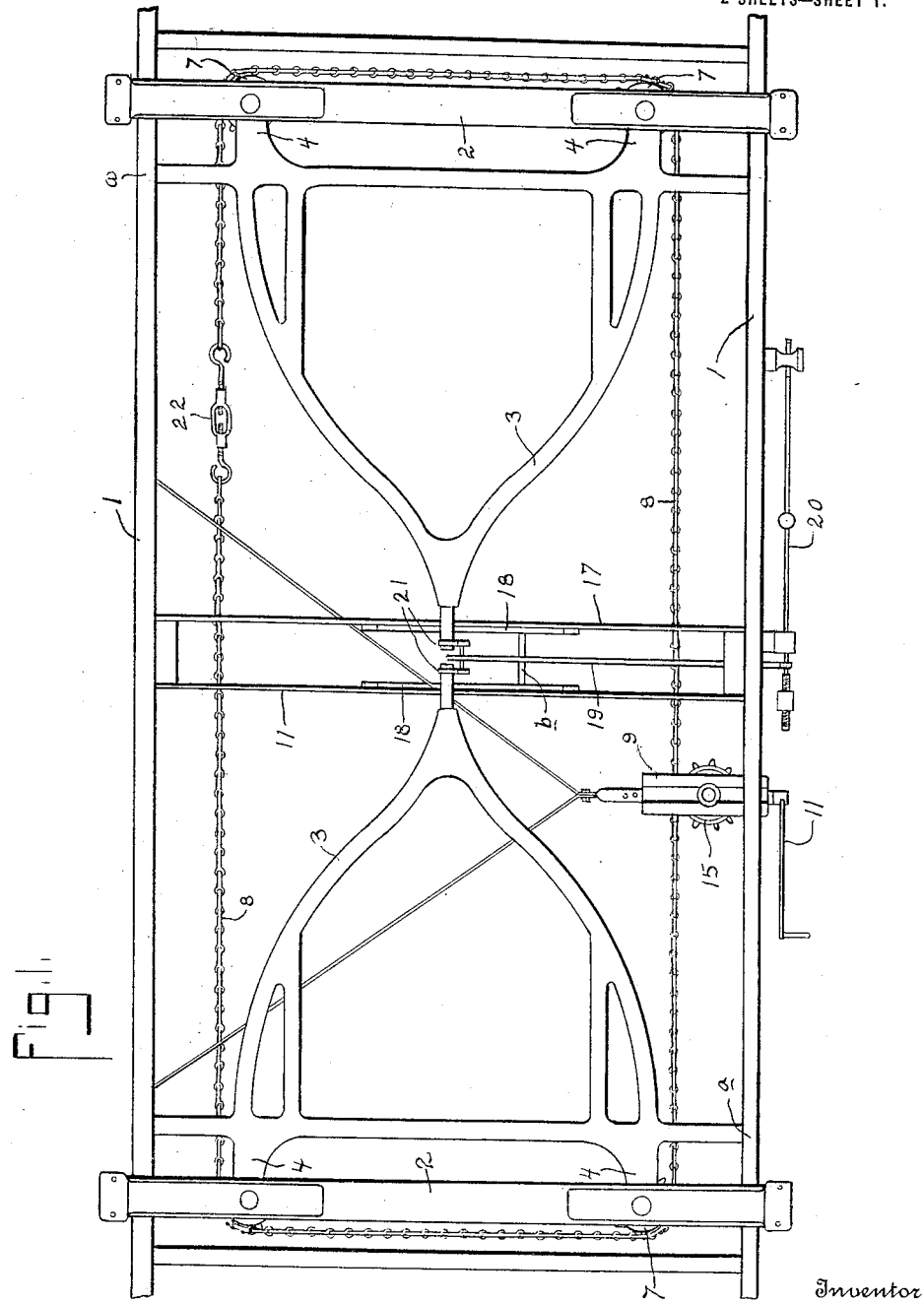

UNITED STATES PATENT OFFICE.

MARTIN E. ANDERSON, OF DE KALB, ILLINOIS, ASSIGNOR TO JACOB HAISH COMPANY, OF DE KALB, ILLINOIS.

WAGON-SCALE.

1,137,447.  Specification of Letters Patent.  Patented Apr. 27, 1915.

Application filed December 11, 1914. Serial No. 876,660.

*To all whom it may concern:*

Be it known that I, MARTIN E. ANDERSON, a citizen of the United States, residing at De Kalb, in the county of Dekalb and State of Illinois, have invented certain new and useful Improvements in Wagon-Scales, of which the following is a specification.

My invention pertains to wagon scales, of that class wherein a load supported on carrying-wheels for the purpose of transportation from one point to another, may be weighed by mechanism carried upon the wagon. In order to do this the weight of the load is transferred from the main frame of the wagon to mechanical parts by which the weight is imparted to the weighing devices, and in the present case the novel features consist in those parts by which the weight of the load is transferred from the main frame to the weighing mechanism and the reverse.

In the drawings: Figure 1 is a plan view of a machine equipped with my device. Fig. 2 is a detail, showing one of the bolster engaging devices. Fig. 3 is an enlarged detail showing the means for operating the device.

1 represents the main frame, upon which a pair of bolsters 2 normally rest, such bolsters being capable of supporting the usual wagon body. (Not shown.) The frame 1 is also adapted to be supported on the bolsters of the usual running gear of a wagon. Pivoted in the sides of the frame 1, as at points *a*, is a pair of frame levers 3, provided with outwardly projecting arms 4, each of which is provided with a threaded perforation in which is held a similarly threaded screw 5, adapted to coöperate with a pin 6 in the end of the bolster 2. Such pin is preferably pointed and the end of the screw provided with a slight depression to receive the same. On the lower ends of the screws 5 are secured sprocket-wheels 7, passing around which is a sprocket-chain 8, capable of simultaneously actuating said wheels to cause a raising or lowering of the screws 5.

Within the frame 1, at one side thereof, is supported a frame 9, in which is journaled a shaft 10, (broken lines) to the outer end of which is secured a crank 11. To the inner end of the shaft 10 is fixed a bevel-gear wheel 12, in mesh with a similar wheel 13 on a shaft 14, journaled in the frame 9 at right angles to the shaft 10. On the lower end of the shaft 14 is a sprocket-wheel 15, in operative position with reference to the chain 8. Mounted in the frame 9 is a guard-roller 16, which prevents the chain 8 from becoming disengaged with the wheel 15. Upon the shaft 10 being suitably rotated by means of the crank 11 the wheels 7 are rotated to cause an upward movement of the screws 5, as above mentioned. A continued upward movement of such screws results in the bolsters 2 being raised from contact with the frame 1, until such bolsters, and the weight sustained thereby rest entirely upon the outer ends of the frames 3.

Transversely of the frame 1 is secured a pair of bars 17, supporting brackets 18, between which is fulcrumed a lever 19, as at *b*. The outer end of said lever is connected in any suitable manner with the short end of a scale-beam 20, pivoted on the side of the frame 1, and the inner end of said lever is connected by means of links 21 with the inner ends of the frame-levers 3. When the weight of the load on the bolsters 2 is transferred to the frames 3, in the manner above described, such weight is thereupon imparted through said frames and the lever 19 to the weighing mechanism, to be indicated thereon. After being weighed, by a reversal of movement of the crank 11 the screws 5 are again moved downwardly until the bolsters and load against rest upon the frame 1, in which position they are normally held.

The chain 8 is preferably provided with a turn-buckle 22, by means of which any slack in the chain may be taken up. Such chain moves up or down freely with the outer ends of the frames 3, and the weight of the chain or other parts is counterbalanced by other parts of the mechanism, or by usual counterbalancing means on the scale-beam.

What I claim as my invention, and desire to secure by Letters-Patent of the United States is:

1. A device of the class named, comprising a main frame, suitably supported; bolsters normally supported on said frame; frame-levers pivoted in said frame and provided at their outer ends with screws adapted to coöperate with said bolsters to raise the same from said frame; weighing devices mounted on said frame and operatively connected with the inner ends of said frame levers; and means for simultaneously operating said screws, to raise said bolsters and transfer the load thereon from said main frame to said frame-levers.

2. A device of the class named, comprising a suitably mounted main frame; load-carrying means normally supported thereon; frame levers pivoted in said frame; screws vertically movable in the outer ends of said frame levers, adapted to coöperate with said load-carrying means to elevate the same above said frame; and provided with similar sprocket-wheels; a sprocket-chain engaging all of said sprocket-wheels, so as to impart rotation thereto simultaneously; weighing-devices mounted on said frame; and operatively connected with the inner ends of said frame-levers; and means for suitably actuating said sprocket-chain.

3. A device of the class named, comprising a suitably mounted frame; load-carrying means normally supported thereon; frame-levers pivoted in said frame, and provided at their outer ends with screws capable of vertical movement to engage said load-carrying means to raise the same from said frame; sprocket-wheels fixed on said screws; a sprocket-chain engaging said wheels and adapted to actuate the same simultaneously; means for suitably operating said chain; weighing mechanism mounted on said frame; and a lever connected with said weighing mechanism and operatively connected with said frame-levers.

4. A device of the class named, comprising a suitably mounted frame; load-carrying means normally mounted thereon; frame-levers pivoted in said frame; screws in the outer ends of said frame-levers adapted to operate vertically to raise or lower said load-carrying devices; sprocket-wheels fixed on said screws; a sprocket-chain engaging said sprocket-wheels and capable of operating the same simultaneously; hand-operated gearing at the side of said frame adapted to suitably actuate said chain; weighing mechanism mounted on said frame; and a lever fulcrumed in said frame, connected with said weighing mechanism, and operatively connected with said frame levers.

5. A device of the class named, comprising a suitably mounted frame; load-carrying devices normally supported on said frame; frame levers fulcrumed in said frame; screws vertically operable in said frame-levers, and adapted to coöperate with said load-carrying devices, to raise or lower the same; sprocket-wheels fixed on said screws; a sprocket-chain engaging said sprocket-wheels to simultaneously operate the same; manually operated means at the side of said frame for actuating said chain; means for taking up the slack in said chain; weighing mechanism mounted on said frame; and a lever fulcrumed in said frame, connected with said weighing mechanism and operatively connected with said frame-levers.

In testimony whereof I affix my signature in presence of two witnesses.

MARTIN E. ANDERSON.

Witnesses:
A. C. HINDS,
F. GRAFFAM.

Copies of this patent may be obtained for five cents each, by addressing the "Commissioner of Patents, Washington, D. C."